US012781772B1

(12) United States Patent
Hsu et al.

(10) Patent No.: US 12,781,772 B1
(45) Date of Patent: Nov. 3, 2026

(54) PNEUMATIC CIRCUIT STRUCTURE OF A PNEUMATIC BOOSTER HYDRAULIC CYLINDER

(71) Applicant: HAN FU INDUSTRIAL CO., LTD., Chiayi City (TW)

(72) Inventors: Wen-Kai Hsu, Chiayi City (TW); Wen-Nan Hsu, Chiayi City (TW)

(73) Assignee: HAN FU INDUSTRIAL CO., LTD., Chiayi City (TW)

( * ) Notice: Subject to any disclaimer, the term of this patent is extended or adjusted under 35 U.S.C. 154(b) by 0 days.

(21) Appl. No.: 19/554,940

(22) Filed: Mar. 3, 2026

(51) Int. Cl.
*F15B 11/072* (2006.01)
*F15B 11/032* (2006.01)

(52) U.S. Cl.
CPC ........ *F15B 11/0725* (2013.01); *F15B 11/032* (2013.01); *F15B 2211/216* (2013.01)

(58) Field of Classification Search
CPC ................ F15B 11/072; F15B 11/0725; F15B 2211/216
See application file for complete search history.

(56) References Cited

U.S. PATENT DOCUMENTS 2,573,993 A * 11/1951 Sedgwick ........... F15B 11/0725 91/32
4,209,987 A * 7/1980 Kononov .................. B30B 1/23 100/270
4,335,867 A * 6/1982 Bihlmaier ............. F15B 11/072 91/358 R

* cited by examiner

*Primary Examiner* — Abiy Teka
(74) *Attorney, Agent, or Firm* — LANWAY IPR SERVICES; Chun-Ming Shih

(57) ABSTRACT

The present invention relates to a pneumatic circuit structure of a pneumatic booster hydraulic cylinder. A gas pressure from a pneumatic source is simultaneously introduced into a pump and an oil tank for pressurization via a controller. The gas pressure introduced into the oil tank is adjusted by a pressure regulating valve and input into the oil tank via a release valve, and the oil tank is provided with a pressure reducing valve, prompting the pump and the oil tank to be pressurized simultaneously to promote rapid lifting of the hydraulic cylinder. When the hydraulic cylinder descends, the gas pressure is switched via the controller and introduced into the hydraulic cylinder via a second release valve, and a pump oil return switch is opened, causing the gas pressure to reversely pressurize in the hydraulic cylinder, accelerating the descending speed of the hydraulic cylinder.

1 Claim, 1 Drawing Sheet

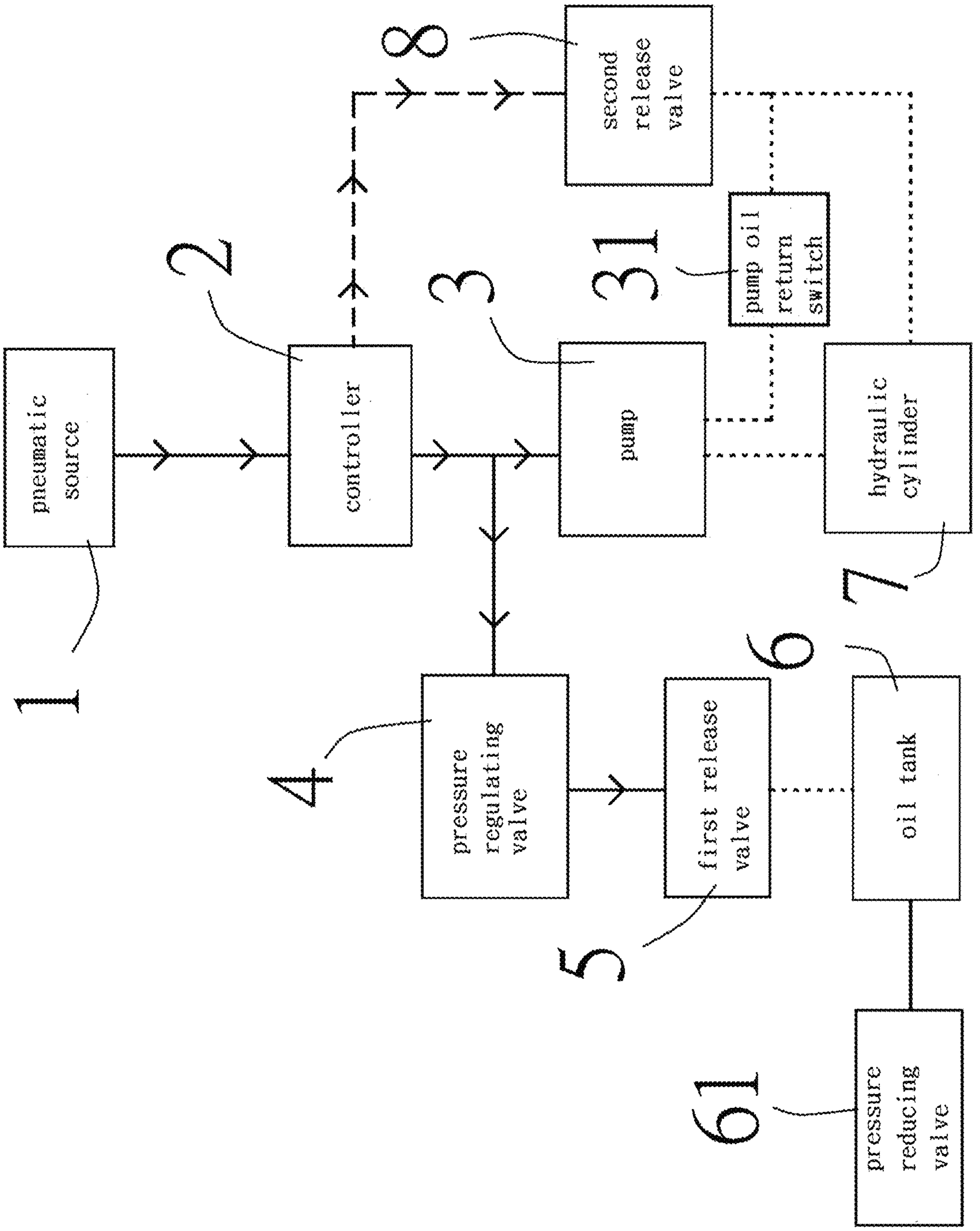
pneumatic source
controller
pump
hydraulic cylinder
second release valve
pump oil return switch
pressure regulating valve
first release valve
oil tank
pressure reducing valve
1
2
3
31
4
5
6
61
7
8

PNEUMATIC CIRCUIT STRUCTURE OF A PNEUMATIC BOOSTER HYDRAULIC CYLINDER

BACKGROUND OF THE INVENTION

Field of the Invention

The present invention relates to a pneumatic booster hydraulic cylinder and, more particularly, to a pneumatic circuit structure of a pneumatic booster hydraulic cylinder.

Description of the Related Art

A hydraulic cylinder is a hydraulic actuator that converts a hydraulic energy into a mechanical energy to perform a linear reciprocating motion (or oscillating motion). The hydraulic cylinder features a simple structure and reliable operation. When the hydraulic cylinder is used to perform a reciprocating motion, deceleration devices can be omitted, and there is no transmission clearance, resulting in a smooth movement. Therefore, the hydraulic cylinder is widely applied in hydraulic systems of various machinery.

Thus, the hydraulic cylinder possesses the characteristics of stable action and strong load capacity. However, the pressure release of the hydraulic oil is achieved by simply opening a control valve to allow the hydraulic oil to return, or must be further achieved through reverse oil suction via a switching valve (requiring the additional design of hydraulic pipelines dedicated to oil return), so that the reset operation of the hydraulic cylinder consumes a significant amount of time. Alternatively, many manufacturing difficulties and cost issues arise due to the processing of the switching valve and its hydraulic pipelines for oil return.

Therefore, in conventional structural designs, it is already possible to achieve the purpose of rapid resetting after lifting via a pneumatic pipeline disposed inside the hydraulic cylinder, thereby solving the time waste associated with the hydraulic cylinder reset operation. However, in the actual operation, there is a lack of further consideration regarding the lifting speed of the hydraulic cylinder, such that the efficacy cannot be fully utilized, making further improvement necessary.

In view of the above-mentioned problems, the applicant realized that the design of the hydraulic cylinder utilizing the gas pressure to accelerate the return speed of the hydraulic oil should also further accelerate the lifting speed of the hydraulic cylinder via a pneumatic circuit structure. Therefore, based on years of professional experience in the design and manufacture of the hydraulic cylinders, and through active research and improvement and careful consideration of various conditions, the composition of the structure of the present invention was finally created to completely solve the afore-mentioned problems.

BRIEF SUMMARY OF THE INVENTION

The primary objective of the present invention is to provide a pneumatic circuit structure of a pneumatic booster hydraulic cylinder, comprising a controller connected to a pump and an oil tank, wherein: a gas pressure from a pneumatic source is delivered by a pipeline and introduced through the controller into the pump and the oil tank to pressurize the pump and the oil tank simultaneously, the gas pressure introduced into the oil tank is first adjusted by a pressure regulating valve, and then introduced through a first release valve into the oil tank which has a pressure reducing valve, so that the pump and the oil tank are pressurized simultaneously to drive a hydraulic cylinder to rise rapidly, and when the hydraulic cylinder resets and descends, the gas pressure is switched by the controller and introduced through a second release valve into a pneumatic pipeline inside the hydraulic cylinder, and a pump oil return switch is opened, so that the gas pressure is reversely pressurized in the pneumatic pipeline of the hydraulic cylinder, thereby accelerating a descending speed of the hydraulic cylinder.

In practice, the gas pressure of the pneumatic source is introduced through the controller into the pump and the oil tank simultaneously for pressurization. The gas pressure introduced into the oil tank is first adjusted by the pressure regulating valve, and then introduced through the first release valve into the oil tank with the pressure reducing valve, so that the pump and the oil tank are pressurized simultaneously to drive the hydraulic cylinder to rise rapidly. When the hydraulic cylinder is to be lowered, the gas pressure is switched by the controller and introduced through the second release valve into the pneumatic pipeline inside the hydraulic cylinder, and the pump oil return switch is opened, so that the gas pressure is reversely pressurized in the pneumatic pipeline of the hydraulic cylinder, thereby accelerating the descending speed of the hydraulic cylinder. Therefore, after implementation, the following effects can be provided.

When the hydraulic cylinder is lifted, the controller allows the gas pressure of the pneumatic source to be simultaneously introduced into the pump and the oil tank for pressurization. The gas pressure introduced into the oil tank is first adjusted by the pressure regulating valve and then input into the oil tank via the release valve. Therefore, the gas pressure input into the oil tank is lower, meanwhile, the second release valve connected to the hydraulic cylinder has no gas pressure input and thus remains normally open, ensuring no pneumatic resistance inside the hydraulic cylinder hinders the rising of the hydraulic cylinder. In addition, the oil tank is provided with the pressure reducing valve capable of automatically reducing the pressure when the pressure in the oil tank is excessive. Thus, a greater hydraulic oil thrust can be generated under the simultaneous pressurization of the pump and the oil tank, to promote rapid lifting of the hydraulic cylinder.

In the reset operation after the lifting of the hydraulic cylinder of the present invention is completed, the gas pressure is switched by the controller and introduced through the second release valve into the pneumatic pipeline inside the hydraulic cylinder, and the pump oil return switch is opened. This causes the gas pressure to reversely pressurize in the pneumatic pipeline of the hydraulic cylinder and allows the hydraulic oil inside the hydraulic cylinder to flow back. Therefore, under the pressurization of the gas pressure, the descending speed of the hydraulic cylinder can be accelerated.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 1 is a structural block diagram of the present invention.

DETAILED DESCRIPTION OF THE INVENTION

To enable the examiner to fully understand the structural composition of the present invention and the functional benefits achieved thereby, the following detailed description is provided in conjunction with the accompanying drawing illustrating embodiments thereof.

Referring to FIG. 1, a pneumatic circuit structure of a pneumatic booster hydraulic cylinder in accordance with the preferred embodiment of the present invention comprises a controller 2 connected to a pneumatic source 1, a pump 3 connected to the controller 2, a pressure regulating valve 4 connected to the controller 2, a first release valve 5 connected to the pressure regulating valve 4, an oil tank 6 connected to the first release valve 5, a hydraulic cylinder 7 connected to the pump 3, a second release valve 8 connected to the controller 2, and a pump oil return switch 31 connected to the pump 3, the second release valve 8, and the hydraulic cylinder 7. The controller 2 is connected to the oil tank 6 via the pressure regulating valve 4 and the first release valve 5. The oil tank 6 has a pressure reducing (or relief) valve 61.

A gas pressure from the pneumatic source 1 is introduced through the controller 2 to pressurize the pump 3 and the oil tank 6 simultaneously. The gas pressure introduced into the oil tank 6 is first adjusted by the pressure regulating valve 4, and then introduced through the first release valve 5 into the oil tank 6 which has the pressure reducing valve 61. In such a manner, the pump 3 and the oil tank 6 are pressurized (or boosted) simultaneously to drive the hydraulic cylinder 7 to rise rapidly. When the hydraulic cylinder 7 resets and descends (or lowers), the gas pressure is switched by the controller 2 and introduced through the second release valve 8 into a pneumatic pipeline inside the hydraulic cylinder 7, and the pump oil return switch 31 is opened, so that the gas pressure is reversely pressurized in the pneumatic pipeline of the hydraulic cylinder 7, thereby accelerating a descending (or lowering) speed of the hydraulic cylinder 7.

It is to be noted that, the controller 2 is connected to the pump 3 and connected to the oil tank 6 via the pressure regulating valve 4 and the first release valve 5. Therefore, when the user wishes to lift the hydraulic cylinder 7, the gas pressure of the pneumatic source 1 is simultaneously introduced via pipelines through the controller 2 into the connected pump 3 and the oil tank 6 for pressurization. For example, when an air pressure of 10 $kg/cm^2$ is delivered into the pump 3, the gas pressure is controlled to drop to 4 $kg/cm^2$ via the pressure regulating valve 4 before being input through the first release valve 5 into the oil tank 6 which has the pressure reducing valve 61. The arrangement of the pressure reducing valve 61 can prevent danger occurring due to an excessive internal gas pressure in the oil tank 6. In such a manner, the hydraulic oil in the oil tank 6 has a thrust of 4 $kg/cm^2$. Therefore, the hydraulic oil output via the pump 3 will generate a thrust of about 14 $kg/cm^2$, so that the hydraulic cylinder 7 is lifted rapidly. At this time, the second release valve 8 connected to the hydraulic cylinder 7 has no gas pressure input, so the second release valve 8 remains normally open, allowing the air pressure inside the hydraulic cylinder 7 to be discharged from the second release valve 8, ensuring no pneumatic resistance hinders the rising of the hydraulic cylinder 7. When performing resetting of the hydraulic cylinder 7, the gas pressure is switched via the controller 2 to be introduced into the pneumatic pipeline inside the hydraulic cylinder 7 via the second release valve 8, and the pump oil return switch 31 is opened. Thus, the gas pressure is reversely pressurized in the pneumatic pipeline of the hydraulic cylinder 7, so that the hydraulic cylinder 7 is lowered rapidly.

From the above description of the present invention, it can be understood that the detailed description above is directed to a specific feasible embodiment of the present invention. However, this preferred embodiment is not intended to limit the claim(s) of the present invention. Any equivalent implementation or modification made without departing from the technical spirit of the present invention, such as simple replacement of equivalent components, or solely adopting hydraulic cylinder pressurized lifting or hydraulic cylinder pressurized resetting, and similar techniques, shall all be included within the claim(s) of the present invention.

The invention claimed is:

1. A pneumatic circuit structure of a pneumatic booster hydraulic cylinder, comprising:

a controller connected to a pump and an oil tank;

wherein:

a gas pressure from a pneumatic source is delivered by a pipeline and introduced through the controller into the pump and the oil tank to pressurize the pump and the oil tank simultaneously;

the gas pressure introduced into the oil tank is first adjusted by a pressure regulating valve, and then introduced through a first release valve into the oil tank which has a pressure reducing valve, so that the pump and the oil tank are pressurized simultaneously to drive a hydraulic cylinder to rise rapidly; and when the hydraulic cylinder resets and descends, the gas pressure is switched by the controller and introduced through a second release valve into a pneumatic pipeline inside the hydraulic cylinder, and a pump oil return switch is opened, so that the gas pressure is reversely pressurized in the pneumatic pipeline of the hydraulic cylinder, thereby accelerating a descending speed of the hydraulic cylinder.

* * * * *